(No Model.)
J. FULTON.
ATTACHMENT FOR CORN PLANTERS.
No. 394,351.　　　　　　　　　Patented Dec. 11, 1888.
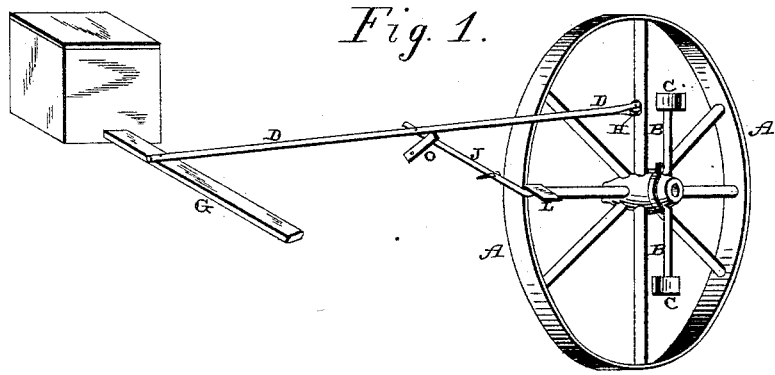
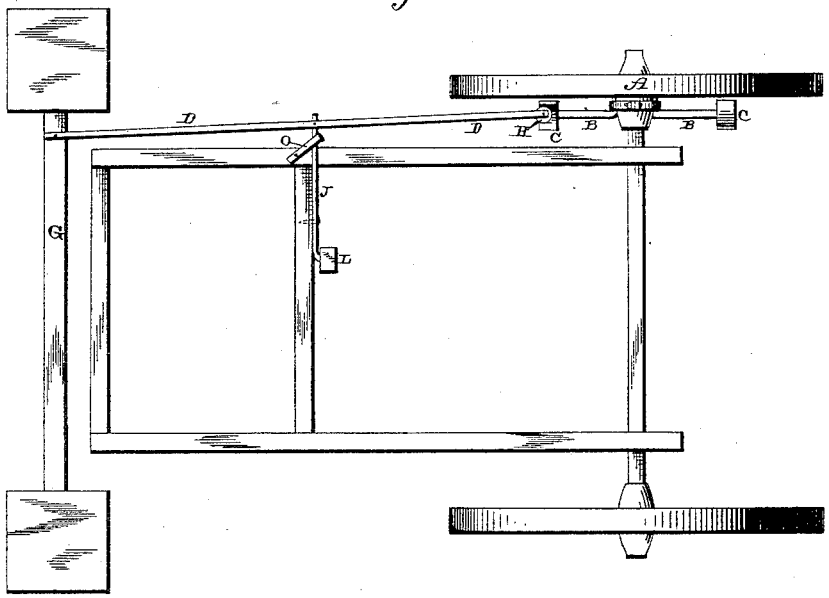
Witnesses.
Edm. P. Ellis,
L. L. Burket.
Inventor.
Jno. Fulton,
per F. A. Lehmann,
Atty.

UNITED STATES PATENT OFFICE.

JOHN FULTON, OF BIGGS, OREGON.

ATTACHMENT FOR CORN-PLANTERS.

SPECIFICATION forming part of Letters Patent No. 394,351, dated December 11, 1888.

Application filed July 31, 1888. Serial No. 281,551. (No model.)

*To all whom it may concern:*

Be it known that I, JOHN FULTON, of Biggs, in the county of Wasco and State of Oregon, have invented certain new and useful Improvements in Attachments for Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for corn-planters; and it consists in two arms or plates placed at a suitable angle, and which are attached to the hub of one of the wheels, a lever which is attached at one end to the seed-slide and which is operated at the other end by the arms, and which is pivoted near its center to the foot-lever, by means of which it can be moved out of contact with the arms, and a spring for returning the foot-lever and the operating-lever to position after they have been moved by the operator, as will be more fully described hereinafter.

The object of my invention is to provide an attachment consisting of a number of separate pieces which can be applied to any of the two-wheel corn-planters now in use, and by means of which the planter is made to automatically drop the seed as it is drawn along.

Figure 1 represents a perspective view of an attachment which embodies my invention, the parts being shown detached from the planter. Fig. 2 is a plan view of a planter, showing the parts attached thereto.

A represents one of the wheels of the planter, and B two arms which are secured to the hub of the wheel by means of a clamping-ring which is passed around the hub and the inner ends of the two arms. The inner ends of the arms are bent at right angles and are concaved on their inner sides, so as to conform to the shape of the hub, and after having been applied to opposite sides of the hubs they are rigidly secured thereto by means of the ring or band, which is tightened upon them. The outer ends of the arms have bearing-plates C secured to them, and these plates are turned at such an angle that they act as cams as the wheel revolves for the purpose of operating the lever D, which is pivoted at or near its center and connected at its front end to the seed-slide G. Each time one of the arms strikes against the roller H, journaled in the end of the lever, the rear end of the lever is moved laterally, and as the lever turns upon its pivot the front end is made to move the seed-slide, so as to drop the corn.

Pivoted to one of the cross-timbers of the frame is the lever J, which has a foot-plate, L, formed upon its inner end, and has its outer end bifurcated, so as to allow the operating-lever to be operated therein. The pivot upon which the foot-lever turns is placed near its inner end, and when the inner end is depressed by the foot of the operator the longer and outer end of the lever is made to raise the operating-lever, so as to move it out of the range of the operating-arms secured to the hub. Secured upon the top of the same cross-piece of the frame to which the foot-lever is pivoted is a suitable flat spring, O, which bears upon the outer end of the foot-lever, so as to instantly depress it and the operating-lever whenever they are left free to be moved after having been elevated by the driver. As soon as the driver removes his foot from the inner end of the foot-lever the spring instantly returns the operating-lever into position for having its rear end struck by the arms. Any suitable device may be employed to prevent the inner end of the foot-lever from being depressed below a certain point.

By means of the parts herein shown and described, consisting of the two arms, the ring for securing them to the hub, the operating-lever, the foot-lever, and the spring, any of the two-wheel planters now in use, and in which the seed-slide is operated by the driver, is converted into an automatic dropper which will cause the seed-slide to operate with the utmost precision and accuracy.

Having thus described my invention, I claim—

As an attachment for a corn-planter, the combination of the two arms which are secured to the hub of one of the wheels, an operating-lever connected to the seed-slide at its front end and pivoted to the outer end of the foot-lever, with the foot-lever pivoted upon the frame of the corn-planter, and a spring for returning the levers to position after having been moved, substantially as shown and described.

In testimony whereof I affix my signature in presence of two witnesses.

JOHN FULTON.

Witnesses:
R. F. GIBONS,
GEO. G. GIBONS.